264-321 SR
3/28/85 XP RE 31,898

United States Patent [19]
Suter

[11] E Patent Number: Re. 31,898
[45] Reissued Date of Patent: May 28, 1985

[54] INFLATABLE-DEFLATABLE FLEXIBLE STRUCTURAL COMPONENT

[75] Inventor: Charles A. Suter, Stow, Ohio

[73] Assignee: Goodyear Aerospace Corporation, Akron, Ohio

[21] Appl. No.: 611,460

[22] Filed: May 17, 1984

Related U.S. Patent Documents

Reissue of:
[64] Patent No.: 3,675,377
Issued: Jul. 11, 1972
Appl. No.: 69,076
Filed: Sep. 2, 1970

[51] Int. Cl.[3] ..... E04B 1/343; E04G 9/08; B32B 3/08

[52] U.S. Cl. ..... 52/2; 5/449; 5/481; 52/22; 52/309.6; 52/309.11; 206/522; 264/54; 264/321; 428/12; 428/71; 428/178; 428/311.5; 428/317.1; 428/318.4; 441/41

[58] Field of Search ..... 5/449, 481; 52/2, 309.6, 52/309.11; 114/345; 206/522; 264/54, 321; 428/12, 71, 76, 178, 304.4, 311.1, 311.5, 317.1, 317.3, 317.5, 317.7, 318.4, 319.7; 441/38, 40, 41, 114–116

[56] References Cited

U.S. PATENT DOCUMENTS

| | | | |
|---|---|---|---|
| 2,647,399 | 4/1953 | Newbill, Jr. | 428/319.1 |
| 2,997,100 | 8/1961 | Morris | 5/450 |
| 3,028,279 | 4/1962 | Heberlein | 428/304.4 |
| 3,246,443 | 4/1966 | Slemmons | 206/484 |
| 3,307,318 | 3/1967 | Bauman | 428/304.4 |
| 3,325,338 | 6/1967 | Geen | 428/319.7 |
| 3,378,864 | 4/1968 | Cornes | 441/41 |
| 3,400,196 | 9/1968 | LeRoy | 428/311.5 |
| 3,554,135 | 1/1971 | Duvall et al. | 206/522 |
| 3,558,417 | 1/1971 | Salyer et al. | 428/318.4 |
| 3,667,625 | 6/1972 | Lucas | 206/522 |

FOREIGN PATENT DOCUMENTS

| | | |
|---|---|---|
| 428124 | 7/1967 | Switzerland . |
| 984604 | 2/1965 | United Kingdom . |

*Primary Examiner*—William J. Van Balen
*Attorney, Agent, or Firm*—P. E. Milliken; J. D. Wolfe; L. A. Germain

[57] ABSTRACT

An inflatable-deflatable flexible structural component comprising a flexible foam core portion having a fabric covering, the fabric being sealed against loss of air by a flexible elastomeric coating.

3 Claims, 2 Drawing Figures

INFLATABLE-DEFLATABLE FLEXIBLE STRUCTURAL COMPONENT

Matter enclosed in heavy brackets [ ] appears in the original patent but forms no part of this reissue specification; matter printed in italics indicates the additions made by reissue.

This invention relates to an inflatable-deflatable flexible structural component having relative dimensional stability and which can be collapsed into a package of relatively small size and to the method of manufacturing such a component.

The described structural component would be used to make inflatable-deflatable shelters, boats, shipping containers, and other articles.

Flexible inflatable-deflatable shelters, boats and shipping containers have been manufactured from rubberized fabric for many years. A major limitation in the design of such objects is that an inflatable flexible component will tend to assume a round shape when inflated. Thus, inflated articles are made as a series of tubes, spheres, or other bodies with surface of revolution. This is undesirable, since it limits configuration and design flexibility and leads to a large number of separate inflated components to make an object of the desired configuration and also increases the material and construction costs.

It is an object of this invention to provide a method of making an inflatable-deflatable structural component, the walls of which will assume a shape upon inflation other than that of a surface of revolution.

Figure 1:
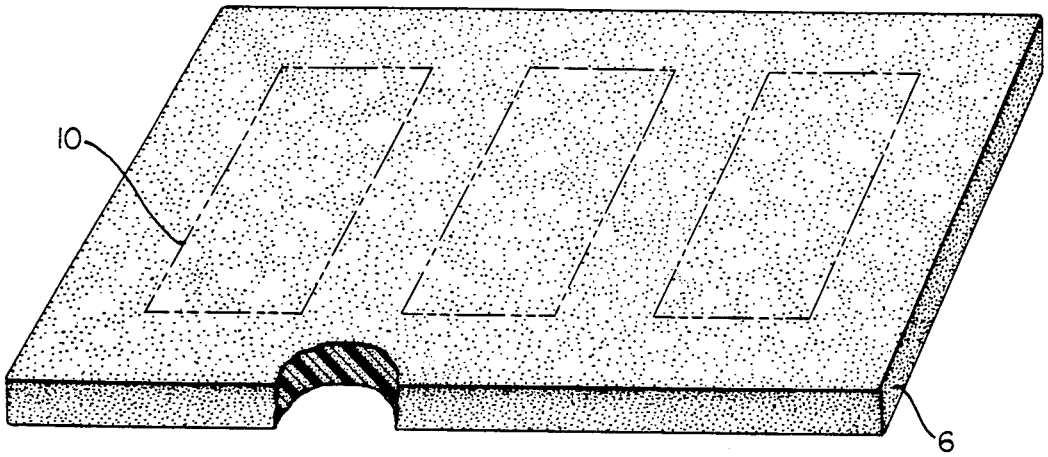
Figure 2:
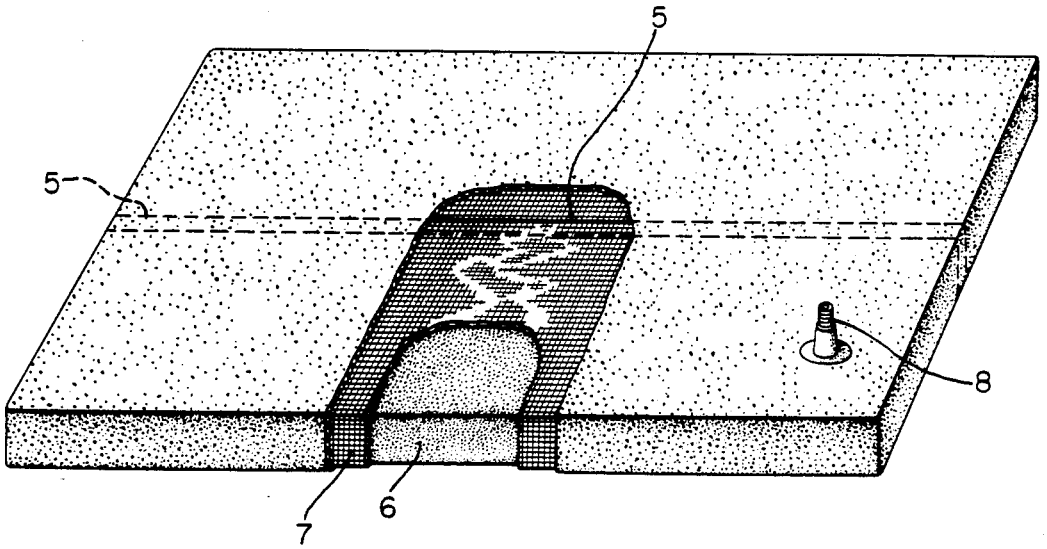

The objects and advantages of this invention may be more readily understood and appreciated by reference to the accompanying drawing where FIG. 1 is a perspective view of a block of foam of the shape desired and FIG. 2 is a perspective view of the finished inflatable-deflatable structural component having portion in section to illustrate the construction features.

The above objects of this invention can be accomplished by covering an open cell foam preferably of the reticulated type with a rubberized fabric to give a container which encloses the foam and which can be inflated by the introduction of air usually at about 5–20 pounds per square inch pressure and can be deflated by placing a vacuum on the container. Preferably the open cell foam is shaped in the desired configuration at the time the foam is being molded or at the time it is being cut from the slab stock. For instance, the foam may be formed in a mold having the desired rectangular configuration, for instance 3×3 feet×3 inches. Then this foam is given a brush or roll coat of a suitable adhesive and the rubberized fabric is spread thereon and adhered to the foam by the adhesive with the seams in the fabric being cemented together with a suitable fabric adhesive.

Polyurethane foams can be prepared by reacting an organic polyisocyanate with a hydrocarbon polyol of about 500 to 10,000 molecular weight and preferably 700 to 4,000 molecular weight in the presence of a blowing agent such as water, a low boiling or gas generating agent or combinations of these, either with or without various polyurethane catalysts. Other useful foams are latex foam and vinyl resin foams.

These foams can be reticulated by subjecting the foam to a flame front or fire polishing to remove the thin diaphragm covering of the windows of the individual cells and cause thickening of the cell walls as the foam passes through a state approximating its thermoplastic or flow temperature.

The nature of the reticulated foams may more readily be understood by reference to the following examples wherein all parts are by weight unless otherwise indicated.

EXAMPLE I

One hundred thousand parts by weight of a hydroxyl terminated copolymer of butadiene and acrylonitrile of about 2,000 molecular weight where the butadiene content is approximately 85 percent and the acrylonitrile content is approximately 15 percent containing 3,000 parts of water, 270 parts of dibutyl tin dilaurate, 90 parts of 2-dimethylamino-2-methyl-1-propanol and 25 parts of silicone γ and 200 parts of Silicone L-520 were mixed in a suitable one-shot foam apparatus (an Admiral Foam machine) with 35,000 parts of a commercial toluene diisocyanate (80/20 isomeric mixture) and allowed to foam in a cubic shaped mold of about 1 cubic foot to form a foam having a density of about 2 pounds per cubic foot. A specimen of this cured foam was placed within a suitable retaining mold and the pores or cells thereof filled with a mixture of approximately 20 percent propane and 80 percent oxygen. Then the mold was closed and the propane-oxygen mixture was ignited by passing a current from a 10,000-volt spark generator through an automobile spark plug projecting within the mold. The resulting explosion reticulated or fire polished the foam to give a foam bun having approximately 5 pores per inch. In other cases foams were successfully reticulated containing up to 100 pores per inch. This reticulated foam had an orange color and a density of approximately 2 pounds per cubic foot, a tensile strength of approximately 12 to 14 pounds per square inch and an ultimate elongation of approximately 150 to 160 percent and a tear resistance of 5 pounds per inch.

Silicon L-520 is a blocked silicone oxyalkylene copolymer where the hydrocarbon radicals of the blocks are oxyethylene and oxypropylene containing 15 to 19 oxyethylene and 11 to 15 oxypropylene units. Silicone γ is a poly oxyalkylene silicone where the alkylene radical is propylene.

EXAMPLE II

Other foams were made with the recipe shown for Runs A to D, in Table 1:

TABLE 1

| | Run Numbers | | | |
|---|---|---|---|---|
| | A | B | C | D |
| Polybutadiene diol | 100 | 100 | 100 | 100 |
| Water | 3 | 3 | 3 | 3 |
| Dibutyltin dilaurate | 0.26 | 0.33 | 0.33 | 0.33 |
| 2-Dimethylamino-2-methyl-1-propanol | 0.44 | 0.44 | 0.42 | 0.44 |
| Silicone y | 0.025 | 0.05* | 0.05 | 0.05 |
| Silicone L-520 | 0.20 | 0.23 | 0.28 | 0.25 |
| Toluene diisocyanate (80/20 isomers) | 38 | 38 | 38 | 38 |

The foam from Run A had relatively large cells, while the foam from Run B had cells of approximately the same average size except some smaller cells were intermixed with the larger cells. The foams of Runs C and D have very noticeable windows covering the cells. Instead of polybutadiene diol, the polyisoprene diols can be used to make foams, too.

Other foams can be made by the one-shot method although the prepolymer or other well-known methods could be used with appropriate adjustment of the catalyst and blowing agent ratios. Also, any of the polyether or polyesters useful for making foams can be used, too. For instance, in Example II a polybutadiene diol having a hydroxyl content of 0.75 milliequivalents per gram was used as the resin and the ingredients were mixed and foamed according to the one-shot technique. The resulting foams had varying cell size with noticeable windows or thin films covering the cells.

A crude methane diphenyl diisocyanate, about 60 parts per 100 parts of the polybutadiene diol, was used instead of toluene diisocyanate to make a satisfactory foam with the above polyols. Other organic polyisocyanates can be used.

Any organic polyisocyanate or mixtures of polyisocyanates may be employed in preparing the cellular polyurethane products. The amount of polyisocyanate employed should be at least sufficient to crosslink the active-hydrogen-containing polymeric material and to react with the water present to generate carbon dioxide gas so generated causes the liquid reaction mixture to foam and form cellular products. In general, it is preferred to use from 2 to 8 equivalents of isocyanate per mol of polymeric material with best results being obtained by the use of approximately 3 mols of a diisocyanate per mol of polymeric material. Representative examples of polyisocyanates which may be employed are the diisocyanates such as hexamethylene diisocyanate; paraphenylene diisocyanate; meta-phenylene diisocyanate; 4,4'-diphenylene diisocyanate; 1,5-naphthalene diisocyanate; 4,4'-diphenylene methane diisocyanate; the tolylene diisocyanates; 4,4'-diphenyl ether diisocyanate; 3,3'-dimethyl 4,4'-diphenyl diisocyanate; and 3,3'-dimethoxy 4,4'-diphenyl diisocyanate; the triisocyanates such as 4,4',4''-triphenyl methane diisocyanate; and toluene 2,4,6-triisocyanate; the tetraisocyanates such as 4,4'-dimethyldiphenyl methane 2,2',5,5'-tetraisocyanate and mixtures of polyisocyanates. Of these the liquid tolylene diisocyanates, such as 2,4-tolylene diisocyanate and 2,6-tolylene diisocyanate or mixtures thereof and toluene 2,4,6-triisocyanate are particularly preferred.

A copolymer containing approximately 75 percent butadiene and approximately 25 percent styrene and having a hydroxyl content of 0.75 milli-equivalents per gram (designated hereinafter as Resin CS-15) can be used to prepare a foam by the one-shot technique.

The hydrocarbon diols or polyols of 2 to 5 hydroxyls useful in this invention in general are prepared by polymerizing an olefin such as a conjugated diolefin alone or in conjunction with an alpha olefin to give a polymer which is then hydroxyl terminated. Representative examples of these olefins are ethylene, propylene, butylene, amylene, hexylene, styrene, acrylonitrile and related aliphatic and aromatic olefins of about two to 20 carbon atoms, with those of two to 12 being the more desirable ones. The conjugated diolefins are represented by butadiene, isoprene, piperylene, ethyl butadiene and the other well-known conjugated diolefins having from four to 12 carbon atoms.

The polymerization of the olefins may be achieved with an alkali metal such as lithium or organo-alkali compounds and then the hydroxyl group is introduced by removal of the alkali metal with water, formaldehyde, ethylene oxide and other agents well known to the art. It should be indicated that the degree of saturation or unsaturation can be controlled by hydrogenation.

The foams prepared in Example I, as well as the polyisoprene diol prepared foam, were reticulated according to the technique described in Example I and the resulting foams were found to be equivalent in physical characteristics to the commercial reticulated polyesterurethane foams and superior thereto in their resistance to hydrolysis and microbiological attack.

The amount of blowing agent used is controlled normally by the density desired in the finished foam. For instance, the water can vary from 0.5 to about 5 or 6 parts per hundred. The blowing agents such as the fluorinated hydrocarbons and methylene chloride can be used in equivalent amounts to vary the foam density.

Reticulated foam is used within this specification to indicate a foam which has been fire polished to destroy the membranes or thin films joining the strands which divide contiguous cells without destroying the strands of the skeletal structure, or has been treated chemically to destroy the strands or windows.

EXAMPLE III

A block of reticulated polyester polyurethane foam obtained from the Foam Division, Scott Paper Company, as Scott Industrial Foam, 20–10 pores per inch, having the dimensions 30×30×3½ inches, was covered with a square woven nylon cloth which previously had been coated with 50/50 toluene methyl ethyl ketone solution of a polyurethane liquid reaction mixture of 2,000 molecular weight polyethylene adipate, polypropylene adipate, 2,000 molecular weight polybutylene adipate reacted with toluene diisocyanate (80/20 isomer mixture), to form a prepolymer and then further reacted with methylene orthodichloroaniline and mercaptobenzothiazole. The liquid reaction mixture used to precoat the cloth was also used as the adhesive between the coated fabric and the foam and in seaming the coated fabric. A valve was adhered to the coated fabric. The structural component was heated in an oven at 230° F. for 3 hours, prior to making the final seams, to evaporate all solvent from the foam and adhesive.

The structural component was then attached to a vacuum pump. The panel was reduced in thickness from 3½ inches to ⅜ inch. The structural component was then inflated with compressed air. The panel was essentially dimensionally stable as the pressure was increased from 0 to 10 p.s.i. Between 10 and 20 p.s.i. there was some increase in thickness. Thus, this degree of inflation is sufficient to give the bag the desired rigidity without destroying the foam, where p.s.i. is gauge.

EXAMPLE IV

An open celled polypropylene ether urethane foam unreticulated, having dimensions such as 12×2 feet×4 inches may be covered with an open weave nylon fabric with the seams 5 being cemented together with a polyurethane reaction mixture. Then the foam 6 covered with cloth 7 may be given a coating of a very dilute (about 5–10 percent solids) polyurethane reaction mixture to tie the cloth to the foam and also at least partly fill the interstices of the fabric. With the cloth bonded to the foam, it is preferred that the next coat of polyurethane reaction mixture be applied in a more concentrated form, i.e. less solvent to build up an airtight covering of about 5 to 25 mils depending on pressure to which the finished container is to be subjected. A valve member 8 may be placed on the cloth prior to application of the first coat of polyurethane and thus be built into the finished container.

It should be appreciated that where the foam is so shaped (for instance, the part shown in dotted outline 10 in FIG. 1 is removed) this container could be a ladder or related structural member.

While certain representative embodiments and details have been shown for the purpose of illustrating the invention, it will be apparent to those skilled in this art that various changes and modifications may be made therein without departing from the spirit or scope of the invention.

What is claimed is:

1. An inflatable-deflatable flexible structural component comprising a flexible open celled foam core portion having a fabric covering adhered to and enclosing said foam and having a valve means in communication therewith, the fabric being sealed against loss of air by a flexible elastomeric coating.

2. The structural component of claim 1 wherein the foam is reticulated.

3. The structural component of claim 1 wherein the foam core is a polyurethane foam and the fabric covering the foam is nylon having a coat of polyurethane thereon.

* * * * *

UNITED STATES PATENT AND TRADEMARK OFFICE

CERTIFICATE OF CORRECTION

PATENT NO. : RE. 31, 898

DATED : May 28, 1985

INVENTOR(S) : Charles A. Suter

It is certified that error appears in the above—identified patent and that said Letters Patent is hereby corrected as shown below:

Column 6, line 2, after "component" insert in italics --- resistant to assuming a rounded shape when inflated ---.

Signed and Sealed this

*Twentieth* Day of *August 1985*

[SEAL]

*Attest:*

DONALD J. QUIGG

*Attesting Officer* *Acting Commissioner of Patents and Trademarks*